(12) United States Patent
Krinke et al.

(10) Patent No.: US 8,240,424 B2
(45) Date of Patent: Aug. 14, 2012

(54) TUBULAR VALVE TOWER EXTENSION ELEMENT

(75) Inventors: Stephan Krinke, Mühlheim-Ruhr (DE); Oliver Braun, Elsdorf-Niederembt (DE)

(73) Assignee: Tedrive Holding B.V., Heerlen (NL)

( * ) Notice: Subject to any disclaimer, the term of this patent is extended or adjusted under 35 U.S.C. 154(b) by 797 days.

(21) Appl. No.: 12/326,384

(22) Filed: Dec. 2, 2008

(65) Prior Publication Data

US 2009/0139597 A1  Jun. 4, 2009

(30) Foreign Application Priority Data

Dec. 3, 2007  (DE) .................. 10 2007 058 402

(51) Int. Cl.
*B62D 5/06* (2006.01)
(52) U.S. Cl. ........................................ 180/426
(58) Field of Classification Search .............. 180/417, 180/441, 444, 426; 138/155, 120; 285/272, 285/275, 276, 305, 307
See application file for complete search history.

(56) References Cited

U.S. PATENT DOCUMENTS

| | | | | |
|---|---|---|---|---|
| 2,910,887 A | * | 11/1959 | Helms | 74/493 |
| 3,889,983 A | * | 6/1975 | Freize et al. | 285/13 |
| 4,106,816 A | * | 8/1978 | August | 301/108.1 |
| 4,366,973 A | * | 1/1983 | Brekke | 285/276 |
| 5,816,624 A | * | 10/1998 | Smith | 285/276 |
| 6,425,605 B1 | * | 7/2002 | Cholakon et al. | 280/775 |
| 7,121,592 B2 | * | 10/2006 | Sazbo et al. | 285/305 |

* cited by examiner

*Primary Examiner* — Tony Winner
(74) *Attorney, Agent, or Firm* — Summa, Additon & Ashe, P.A.

(57) ABSTRACT

The tubular valve tower extension element (30) connects to a free end of a valve tower (22) of a vehicle's steering system. The connection end (42) of the valve tower extension element (30) can be connected to a valve tower (22) and comprises a bearing (32) located opposite the connection end (42) in the region of an opening (34) defined by one end of the extension element (see FIG. 1).

11 Claims, 4 Drawing Sheets

TUBULAR VALVE TOWER EXTENSION ELEMENT

CROSS-REFERENCE TO PRIORITY APPLICATION

This application hereby claims the benefit of the commonly assigned German Patent Application Serial No. 10 2007 058 402.6 (filed Dec. 3, 2007), which is hereby incorporated by reference in its entirety.

FIELD OF THE INVENTION

The present invention relates to a tubular valve tower extension element for connection to a free end of a valve tower of a vehicle's steering system.

BACKGROUND

The invention is particularly suited for toothed rack steering systems that are very often utilized in motor vehicles. A rotating steering movement applied through the steering wheel is converted into a rectilinear movement for pivoting the vehicle wheels to be steered. For this purpose, the end of a steering column of the vehicle is connected to a pinion that engages the toothed rack and displaces it laterally upon rotation of the steering system. On either end of the toothed racks a steering tie rod is connected through a universal joint. The pinion, which is connected to the steering column, is disposed inside a valve tower which is in turn connected to a toothed rack housing surrounding the toothed rack. The toothed rack housing and the valve tower comprise openings that coincide (i.e., correspond to one another) in the mounted condition and form an engagement region for the pinion.

On current power steering systems, rotary servo valves are known for controlling hydraulic pressure and, as a result thereof, steering assistance on an assistance cylinder as a function of the applied steering torque of the driver. In most cases, rotary servo valves are being utilized in which an input shaft, which is connected to the steering wheel through the steering column, rotates relative to a control sleeve which is connected to the output shaft and, in case of toothed rack steering systems, to the pinion. Through a torsion system between input shaft and control sleeve a rotating angle of the valve and, as a result thereof, a torque-dependent valve characteristic is realized. Accordingly, rotation of the input shaft relative to the control sleeve provides the auxiliary force needed for steering.

Accordingly, the input shaft is connected to a first valve element that is configured to be a rotary slide valve located radially inside. The control sleeve is located radially outside of and surrounds this first valve element. Both valve elements comprise control grooves serving to control the pressure means coming from or flowing to work chambers of the servo motor. The control grooves may however also be disposed directly on the input shaft. The manufacturing of these component parts is subject to the highest quality requirements with regards to material selection and production accuracy. Insofar, such type component parts are devised to be short, with the smallest possible dimensions, and are connected in the vehicle to component parts of the steering column that have to meet less stringent quality requirements.

Since the end of the valve tower and the steering wheel are spaced a large distance apart, it is necessary to use quite long steering columns that are often angled through hinges. In order to avoid bearing damages in the region of the valve tower, steering columns are often carried rotatably on several points. The bearings are thereby usually disposed in the region of the bodywork with the steering column extending therethrough. Insofar, the arrangement and positioning of the bearings are essential for steering quality and for less wear of the device over its lifetime. The bearings must be positioned accurately to achieve the desired effects.

SUMMARY OF THE INVENTION

The object of the invention is to provide an apparatus for positively influencing the manufacturing and maintenance of steering systems. More specifically, the apparatus is configured to minimize the costs for manufacturing and maintaining the steering column.

In accordance with the invention, this object is solved by a tubular valve tower extension element having the features of the independent patent claim 1.

The connecting end of the tubular valve tower extension element can be connected with simple means to the free end of a valve tower to thereby lengthen the valve tower in the direction of the steering wheel of the vehicle. In a particularly advantageous embodiment of the present invention, the connection of the valve tower extension element to the valve tower can occur through a screw connection. That said, it will be understood that any number of other means for connection are possible such as press-fitting, caulking, welding, soldering or gluing the elements together.

At its other end, the valve tower extension element comprises an opening through which the input shaft extends. In the region of this opening there is provided a bearing which rotatably carries the input shaft. Depending on the implementation, the steering column rather than the input shaft can extend through the opening, a connection to the input shaft having then to be provided inside of the valve tower extension element.

A major advantage of the present invention is that a vehicle's steering system having a valve tower suited for the valve tower extension element can be mounted into different vehicles when steering columns of different length must be used. By providing an additional bearing through the valve tower extension element, wear of a steering system can be significantly minimized. The steering column is better guided and the sensitive power steering elements in the region of the valve tower are subjected to less heavy loads.

The valve tower extension element is also particularly suited for use with extension elements that are interposed between the input shaft and the steering column. Such type extension elements allow for lengthwise adjustment of the steering column to satisfy certain requirements in vehicle construction. Since the additional bearing is accommodated in the region of the valve tower extension element, savings of an additional bearing for the steering column can be realized in the region of the vehicle.

The valve tower extension element can be made from any suited material, resistant plastic material or conventional metals being particularly suited. The bearing can be formed by known pivot or bush bearings, needle bearings or ball bearings. The opening may further be provided with a peripheral sealing lip on its outside, the lip minimizing penetration of dirt and/or humidity through abutment on the input shaft.

The foregoing and other objects and advantages of the invention and the manner in which the same are accomplished will become clearer based on the following detailed description taken in conjunction with the accompanying drawings.

DETAILED DESCRIPTION

Figure 1:
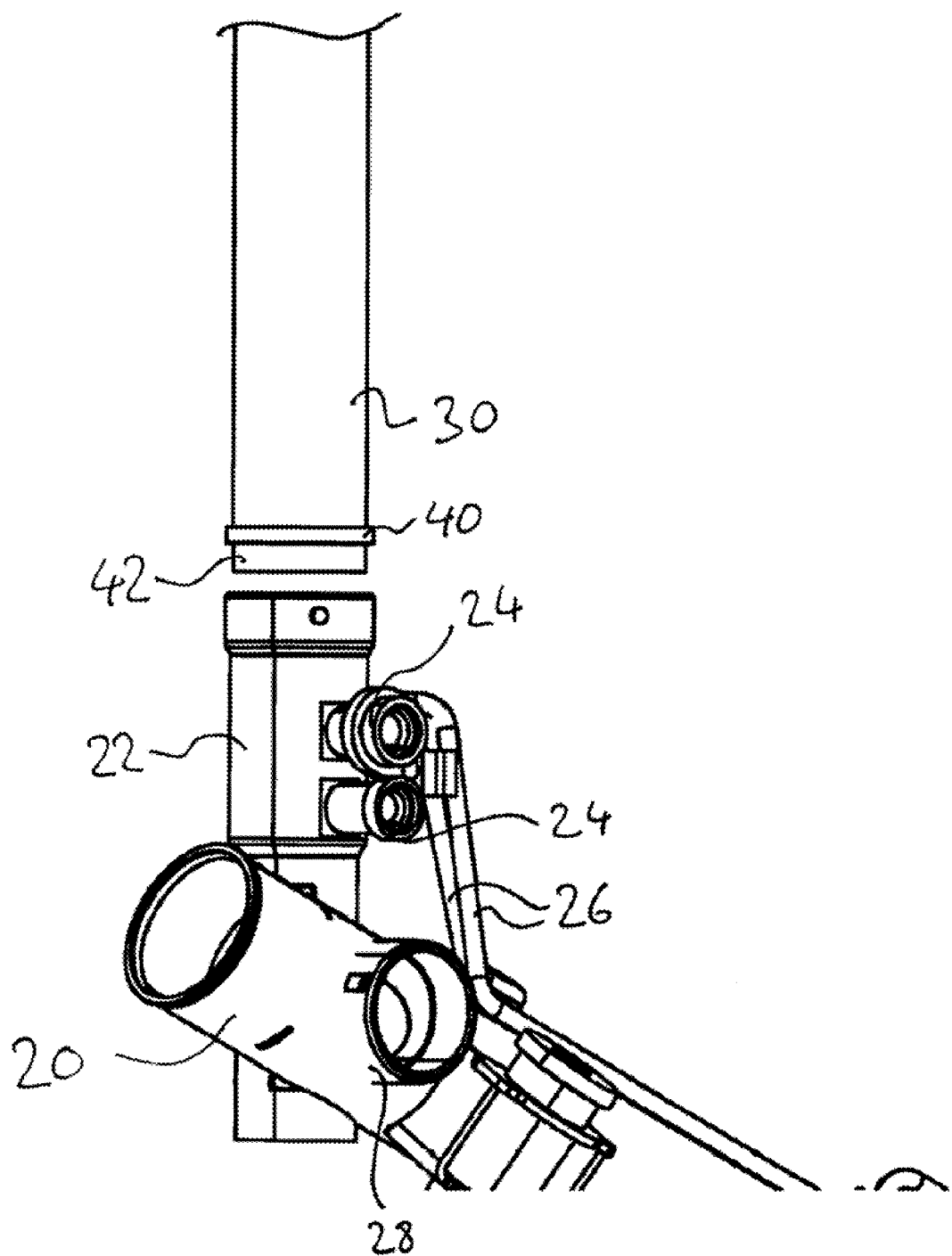
FIG. 1 shows one embodiment a valve tower disposed on a toothed rack and a valve tower extension element.
Figure 2:
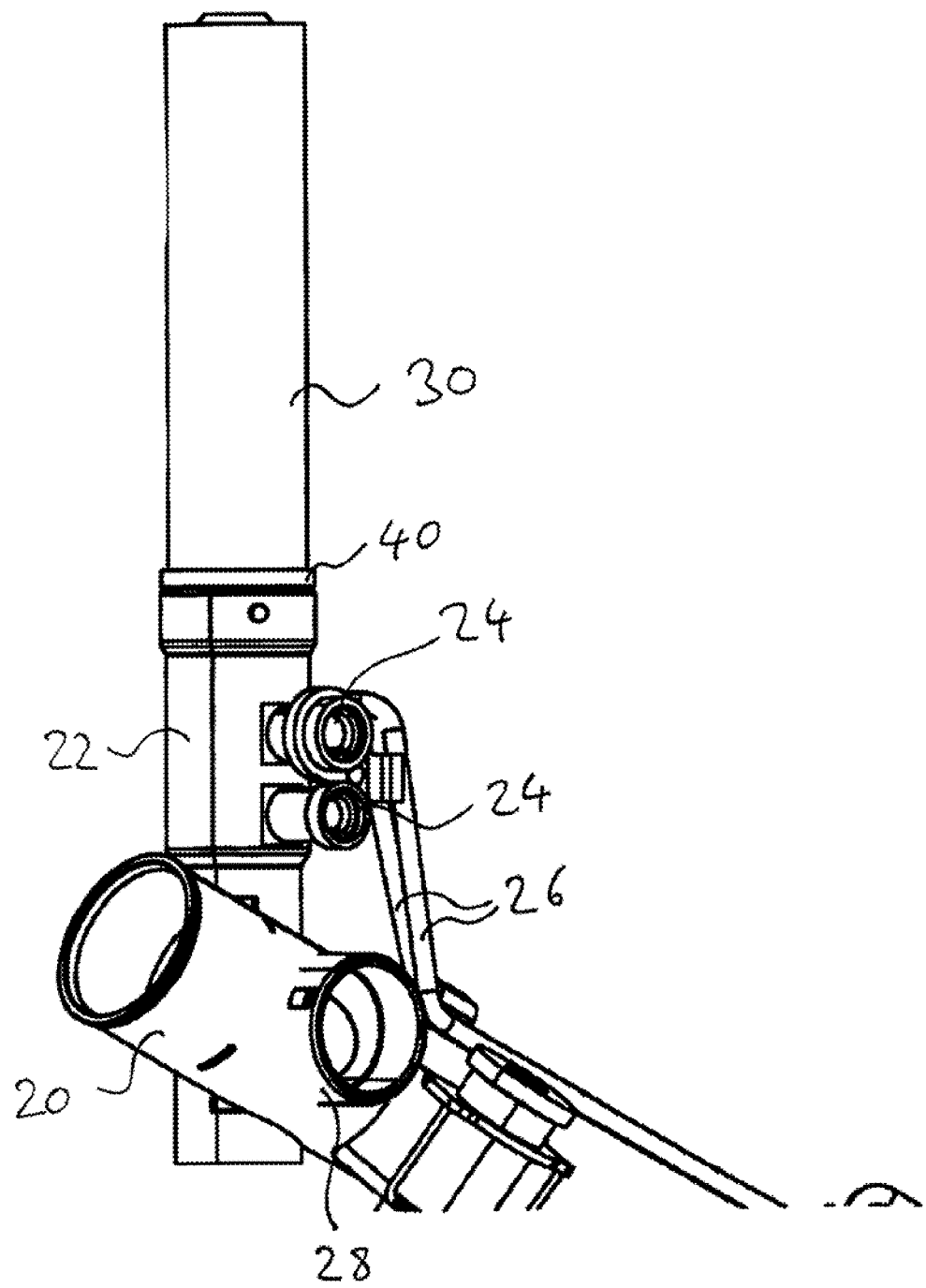
FIG. 2 illustrates one embodiment of the valve tower and the valve tower extension element of FIG. 1 in the connected condition.

FIGS. 1 and 2 show an end region of a toothed rack housing 20 that is connected to a valve tower 22. The valve tower 22 comprises in one embodiment supply connections 24 for pressure lines 26. FIGS. 1 and 2 further show a pressure piece tube 28 for receiving a pressure piece on the side located opposite the valve tower 22 in the opened condition.

A valve tower extension element 30 is connectable to the valve tower 22. For this purpose, the valve tower extension element 30 can comprise in its end region an external thread that can be screwed into an internal thread of the valve tower 22. Alternatively, any other suitable means for connection can be provided.

FIG. 2 illustrates the assembled condition of the valve tower 22 with the valve tower extension element 30.

Figure 3:
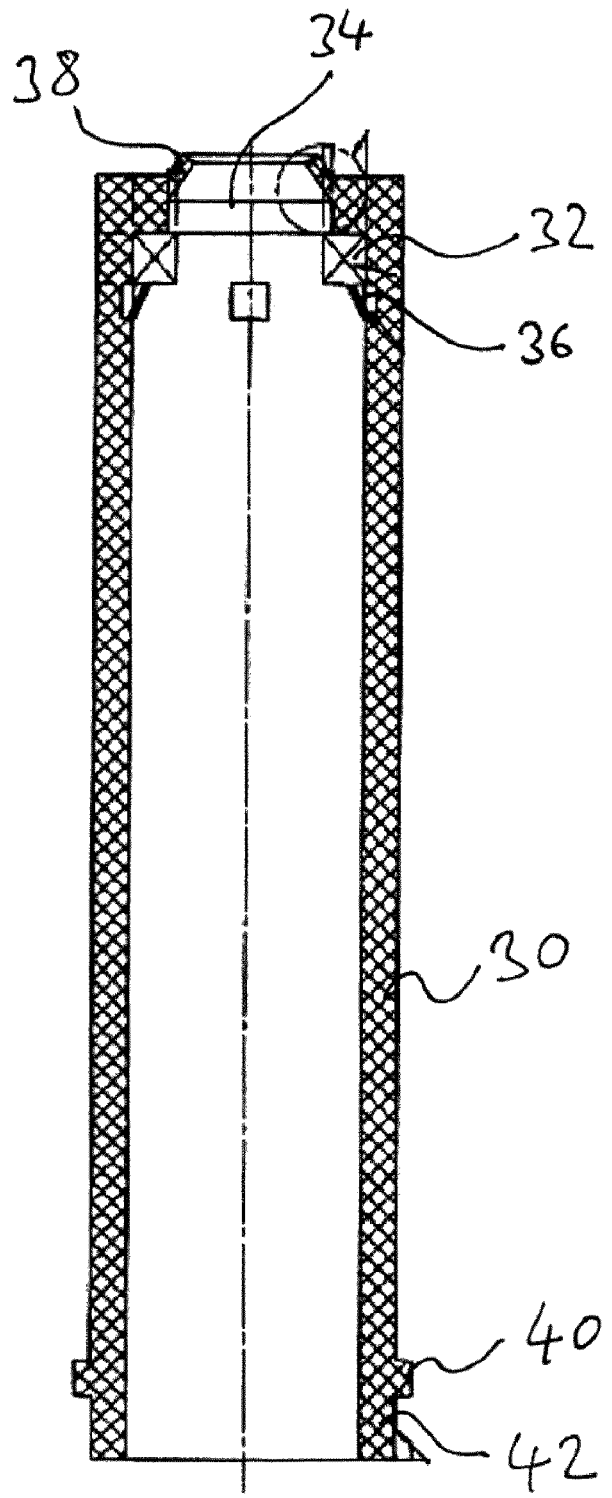
FIG. 3 depicts a sectional view of one embodiment of the valve tower extension element.
Figure 4:
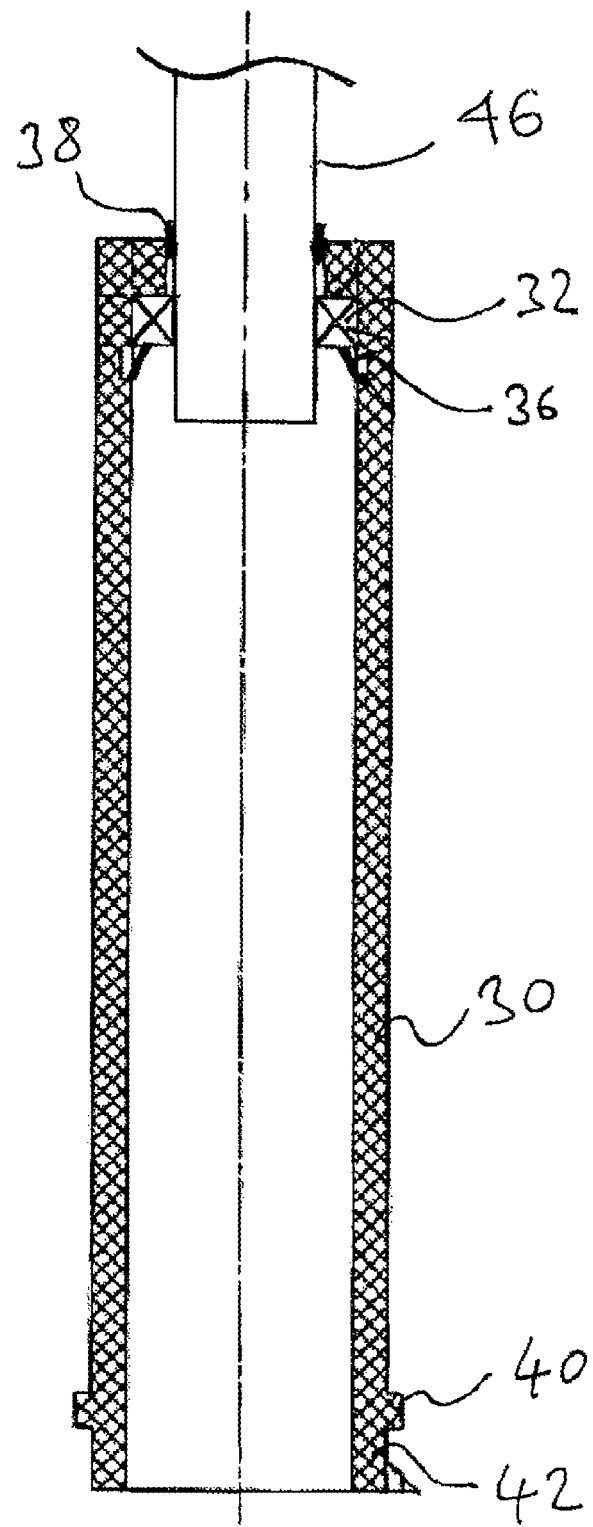
FIG. 4 depicts a sectional view of one embodiment of the valve tower extension illustrating a portion of an input shaft of the vehicle steering system.

As illustrated in FIGS. 3 and 4, a bearing 32 is advantageously provided inside the valve tower extension element 30, wherein the bearing is disposed in the region of an opening 34 defined by one end of the extension element. In the mounted condition, an input shaft (46) of the steering column of the vehicle extends through the opening 34. In the exemplary embodiment shown, the bearing 32 is retained by a retaining ring 36, which in one embodiment may be a circlip or snap ring.

There is further shown a sealing lip 38 which surrounds the opening 34 and prevents or minimizes penetration of humidity or dirt.

In the exemplary embodiment shown, there can further be seen an abutment ring 40 that effects an abutment on the front side end of the valve tower 22. Such an abutment ring 40 may be obviated if the two component parts are, for example, welded or screwed together. Accordingly, the abutment ring 40 is located in the region of a connection end 42 of the valve tower extension element 30. This free connection end 42 can have different shapes, depending upon the shape of the valve tower 22.

The invention is not limited to the exemplary embodiment but also includes all the other embodiments covered by the claims.

The invention claimed is:

1. A tubular valve tower extension element (30) for connection to a free end of a valve tower (22) of a steering system for a vehicle, with a connection end (42) for connection to said valve tower (22), with an opening (34) located opposite said connection end and with a bearing (32) disposed in the region of said opening (34);

wherein the tubular valve tower extension element (30) is connected to the valve tower (22) of the steering system by inserting an input shaft (46) or a steering column of the valve tower (22) through the opening (34) so that the input shaft or steering column is rotatable carried by the bearing (32); and wherein the opening (34) is surrounded by a peripheral sealing lip (38) for minimizing penetration of dirt and/or humidity through abutment on said input shaft or steering column.

2. The tubular valve tower extension element (30) as set forth in claim 1, wherein the bearing (32) is retained by a retaining ring (36).

3. The tubular valve tower extension element (30) as set forth in claim 2, wherein the bearing (32) and the retaining ring (36) are disposed inside the valve tower extension element (30).

4. The tubular valve tower extension element (30) as set forth in claim 1 wherein a thread for screwing onto the valve tower (22) is provided on the connection end (42).

5. A valve tower extension element (30) for use in connection with a valve tower (22) of a vehicle steering system, the valve tower extension element comprising:

a connection end (42) for connecting the extension element (30) to one end of the valve tower (22);

an opening (34) for receiving at least a portion of an input shaft (46) of the steering system, the opening defined by an end of the extension element (32) opposite the connection end (42); and a bearing (32) secured within the valve tower extension element in proximity to the opening (34).

6. The valve tower extension element (30) as set forth in claim 5, further comprising a sealing lip (38) positioned substantially adjacent to the opening (34) and the bearing (32).

7. The valve tower extension element (30) as set forth in claim 5, further comprising a retaining ring (36) for positioning the bearing (32) within the extension element, the retaining ring (36) positioned substantially adjacent to the bearing (32).

8. The valve tower extension element (30) as set forth in claim 5 wherein the connection end (42) of the extension element includes a threaded portion for securing the connection end (42) to an end of the valve tower (22).

9. A valve tower extension element (30) for use in connection with a valve tower (22) of a vehicle steering system, the valve tower extension element comprising:

a connection end (42) for connecting the extension element (30) to an end of the valve tower (22);

an opening (34) defined by an end of the extension element (30) opposite the connection end (42);

a bearing (32) secured within the valve tower extension element in proximity to the opening (34);

a retaining ring (36) for securing the bearing (32) within the extension element, the retaining ring (36) positioned substantially adjacent to the bearing (32); and a sealing lip (38) positioned substantially adjacent to the opening (34).

10. The valve tower extension element (30) as set forth in claim 9 wherein the opening (34) receives at least a portion of an input shaft (46) of the vehicle steering system, the bearing (32) rotatably carrying at least a portion of the input shaft.

11. The valve tower extension element (30) as set forth in claim 9 wherein the opening (34) receives at least a portion of a steering column of the vehicle steering system, the bearing (32) rotatably carrying at least a portion of the steering column.

* * * * *